(12) United States Patent
Greggs

(10) Patent No.: US 9,457,729 B1
(45) Date of Patent: Oct. 4, 2016

(54) VEHICLE COMPONENT SUPPORT STRUCTURE

(71) Applicant: Nissan North America, Inc., Franklin, TN (US)

(72) Inventor: Alan Greggs, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 42 days.

(21) Appl. No.: 14/669,942

(22) Filed: Mar. 26, 2015

(51) Int. Cl.
*B60R 11/00* (2006.01)

(52) U.S. Cl.
CPC ........ *B60R 11/00* (2013.01); *B60R 2011/0003* (2013.01); *B60R 2011/005* (2013.01); *B60R 2011/0024* (2013.01)

(58) Field of Classification Search
CPC ........... B60R 11/00; B60R 2011/0003; B60R 2011/005; B60R 2011/0024
USPC ....................................... 248/222.41, 223.21
See application file for complete search history.

(56) References Cited

U.S. PATENT DOCUMENTS

| | | |
|---|---|---|
| 4,815,558 A | 3/1989 | Krainhofer |
| 4,993,510 A | 2/1991 | Kato et al. |
| 5,416,283 A | 5/1995 | Dault et al. |
| 7,177,438 B2 | 2/2007 | Iwaya et al. |
| 8,272,683 B2 | 9/2012 | Brown et al. |

FOREIGN PATENT DOCUMENTS

| | | |
|---|---|---|
| JP | 08-079348 A | 3/1996 |
| JP | 4190687 B2 | 12/2008 |
| WO | 90-11667 A1 | 10/1990 |

*Primary Examiner* — Dennis H Pedder
*Assistant Examiner* — Melissa A Black
(74) *Attorney, Agent, or Firm* — Global IP Counselors, LLP

(57) ABSTRACT

A panel of a vehicle body structure has a first slot and a second slot spaced apart from one another. A component has a mounting structure that includes a first tab and a second tab spaced apart from the first tab. A first head of the first tab is inserted through a wide second end of the first slot and the second head of the second tab is inserted through a wide second end of the second slot. The first tab and the second tab thereafter moved to a corresponding one of respective narrow first ends of the first and second slots. Consequently, the first head of the first tab rests on a first upper surface portion of a first area of the panel and the second head rests on a third upper surface portion of a second area of the panel thereby suspending the component from the panel.

19 Claims, 9 Drawing Sheets

VEHICLE COMPONENT SUPPORT STRUCTURE

BACKGROUND

1. Field of the Invention

The present invention generally relates to vehicle component support structure. More specifically, the present invention relates to horizontally oriented panel configured to temporarily support a component prior to fasteners being subsequently attached to the component to fixedly attach the component to the panel within the vehicle.

2. Background Information

During the assembling process of a vehicle, various components must be held in place adjacent to a vehicle body structure while fasteners are installed to the component and/or the vehicle body structure in order to fixedly attach the component to the vehicle body structure. During the assembly processes, a robotic apparatus can hold the component in position while the fasteners are being installed. In other assembly processes, a technician holds the component in position and either that same technician or another technician installs the fasteners.

SUMMARY

One object of the disclosure is to provide a panel of a vehicle body structure with features that temporarily retain component in a position that allows for fasteners to be installed to fix the component to the panel without the use of a separate component positioning mechanism.

In view of the state of the known technology, one aspect of the present disclosure is to provide a vehicle component support structure with a vehicle body structure and a component. The vehicle body structure includes a horizontally oriented panel rigidly supported within the vehicle body structure. The panel has an upper surface and a lower surface. A first area of the panel defines a first slot and a second area of the panel spaced apart from the first area defines a second slot. Each of the first and second slots extend from the upper surface to the lower surface of the panel. A first end of the first slot has a first width measured perpendicular to a length of the first slot and a second end of the first slot has a second width that is greater than the first width. The first end of the second slot has a third width and a second end of the second slot has a fourth width greater than the third width. The first area of the panel defines a first upper surface portion at the first end of the first slot and second upper surface portions at either side of the first slot at a location spaced apart from the first end of the first slot. The second upper surface portions are located vertically higher above the first upper surface portion. The second area of the panel defines a third upper surface portion at the first end of the second slot. The component has a main body and a mounting structure. The mounting structure includes a first tab and a second tab spaced apart from the first tab by a distance corresponding to a distance between the first slot and the second slot. The first tab includes a first shaft portion and a first head that is wider than the first shaft portion. The second tab includes a second shaft portion and a second head that is wider than the second shaft portion. The first head of the first tab is inserted through the second end of the first slot, the second head of the second tab is inserted through the second end of the second slot, the first tab and the second tab thereafter moved to a corresponding one of the first end of the first slot and the first end of the second slot. The first head of the first tab thereafter rests on the first upper surface portion of the first area and the second head thereafter rests on the third upper surface portion of the second area to suspend the component from the panel. The second upper surface portions of the first area of the panel restrict movement of the first tab away from the first end of the first slot.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
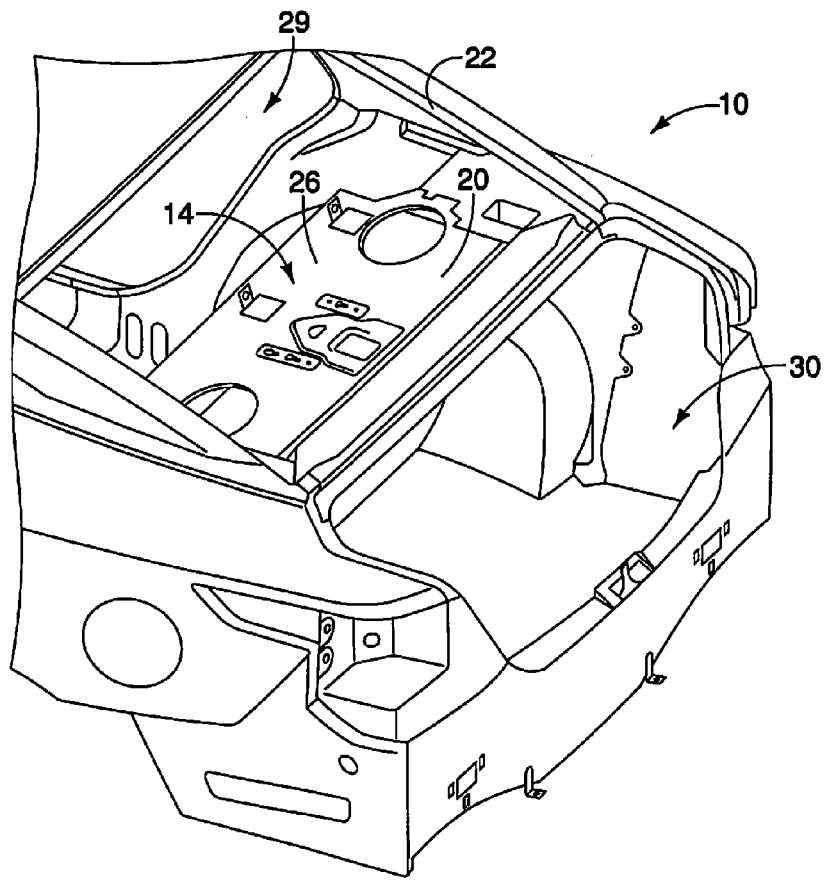
FIG. 1 is a perspective view of a vehicle body structure that includes a component support structure in accordance with a first embodiment.
Figure 2:
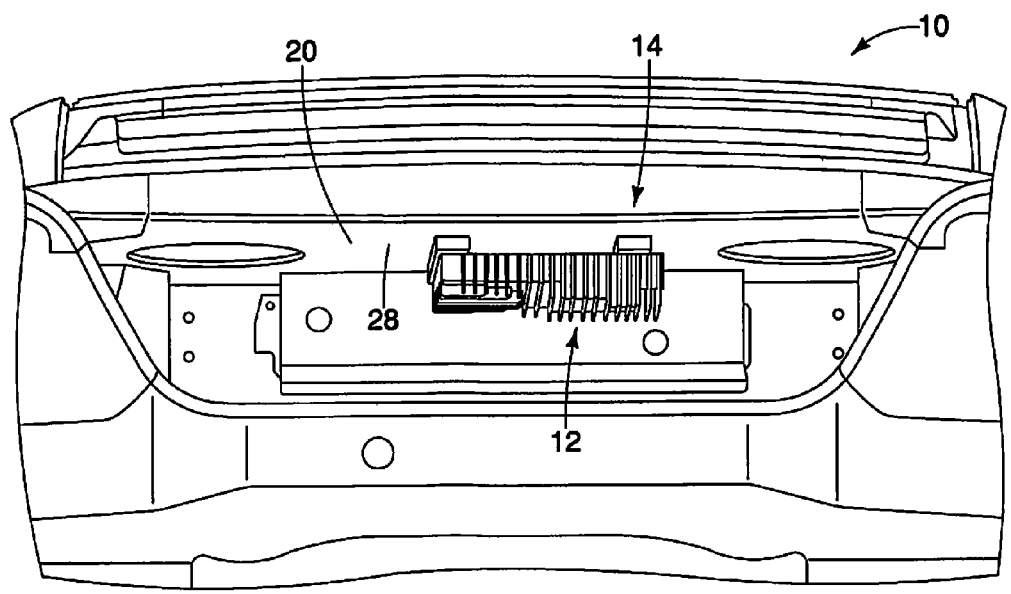
FIG. 2 is a rear perspective view of the vehicle body structure showing a panel of the component support structure and the component mounted to a lower surface of the panel in accordance with the first embodiment.

Referring initially to FIG. 1, a vehicle body structure 10 is illustrated in accordance with a first embodiment. As shown in FIG. 2, a component 12 is installed within the vehicle body structure 10 defining a vehicle component support structure 14 that is described in greater detail below.

The vehicle body structure 10 includes a variety of structural elements that are welded or otherwise rigidly fixed to one another to define a basic vehicle structure, as shown in FIG. 1. Since most of the structural elements of the vehicle body structure 10 are conventional elements, only those structures related to the vehicle component support structure 14 are described herein below for the sake of brevity.

The vehicle body structure 10 as it relates to the vehicle component support structure 14 basically includes a panel 20. The panel 20 is a generally horizontally oriented member that at least partially defines a parcel shelf located at the rear of a passenger compartment of the vehicle, rearward of the passenger seats and beneath a rear window opening 22 (glass is removed in the drawings). The panel 20 has an upper surface 26 and a lower surface 28 and is rigidly supported within the vehicle body structure 10 between rearward pillars (shown as C-pillars) in a conventional manner. The upper surface 26 faces upward and at least partially defines a rear boundary of the passenger compartment 29 of the vehicle body structure 10. The lower surface 28 faces downward and at least partially defines a front and upper boundary of a storage compartment or trunk 30 at the rear of the vehicle body structure 10.

As is described in greater detail below, the panel 20 is specifically modified in order to support the component 12. Prior to a description of the panel 20, a description of the component 12 is provided with specific reference to FIGS. 3 and 4. In the depicted embodiment, the component 12 is an electrical component such as an audio amplifier or an audio/visual processing and amplifying unit that is part of an audio system (not shown) and/or an audio/visual system (not shown) installed within the vehicle body structure 10. For instance, the component 12 can be built to provide electronic amplification for audio signals broadcasted via audio speakers within the vehicle body structure 10, or can also include image processing capability for a global positioning system and/or camera based imaging systems that provides images of areas adjacent to the vehicle body structure 10 during, for example, parking maneuvers. Alternatively, the component 12 can be an audio speaker, or can be any structure, vehicle element, or vehicle feature that is installed to the underside of a panel and can be installed by first temporarily suspending the component 12 prior to installation of mechanical fasteners.

Figure 3:
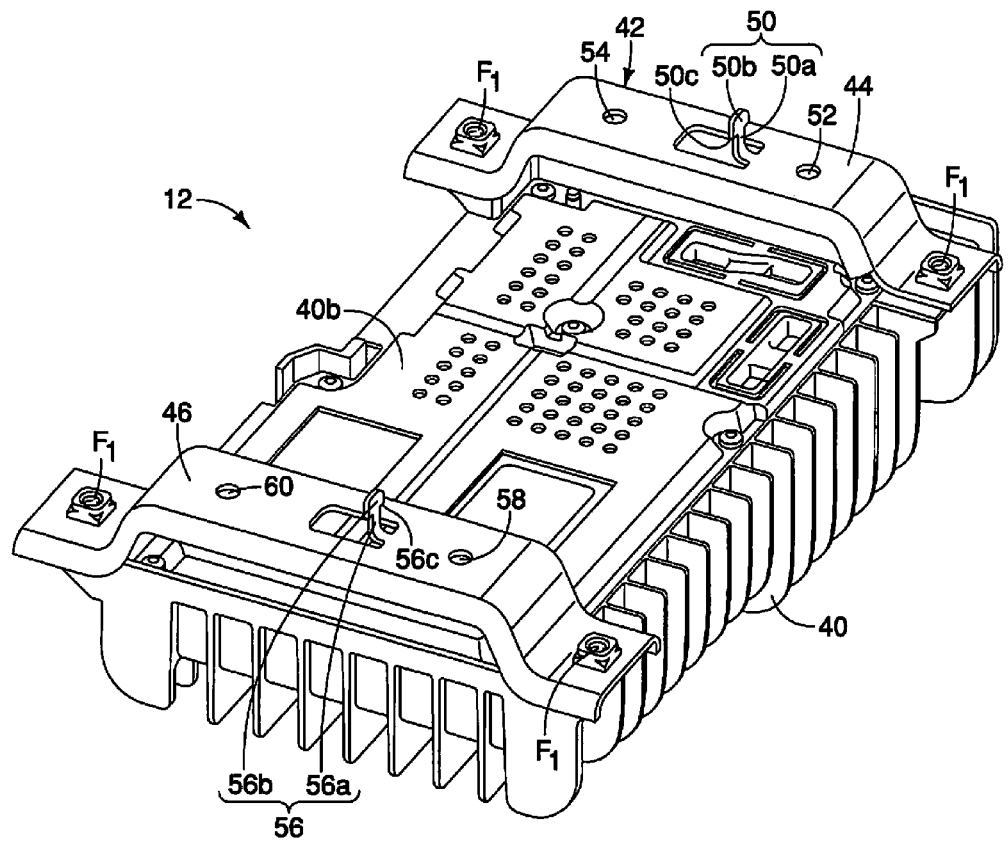
FIG. 3 is a perspective view of the component shown removed from the vehicle body structure and showing a mounting structure that includes upwardly extending tabs configured for attachment to the panel of the vehicle body structure in accordance with the first embodiment.
Figure 4:
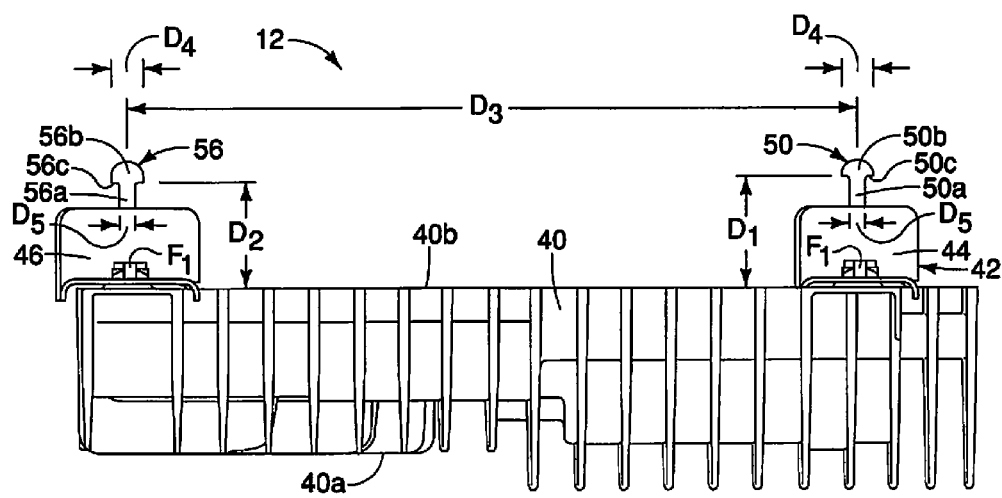
FIG. 4 is a rear view of the component showing a main body and the mounting structure with the tabs extending upwardly from the mounting structure in accordance with the first embodiment.

As shown in FIGS. 3 and 4, the component 12 includes a main body 40 and a mounting structure 42. The main body 40 is basically a case with heat dissipation fins with electronic circuitry and panels (not shown) disposed therein. The main body 40 has a lower surface 40a and an upper surface 40b. The mounting structure 42 of the component 12 includes a first bracket 44 and a second bracket 46. The first bracket 44 and the second bracket 46 are fixedly attached to the main body 40 by, for example, mechanical fasteners $F_1$, but can be attached to the main body 40 by other fastening means, such as clamps or welding.

The first bracket 44 includes a first tab 50, a first fastener aperture 52 and a second fastener aperture 54. The first tab 50 is located between the first fastener aperture 52 and the second fastener aperture 54. The first tab 50 includes a first shaft portion 50a and a first head 50b that is wider than the first shaft portion 50a. Since the first head 50b is wider than the first shaft portion 50a, the first head 50b includes first contact surfaces 50c along lower edges of the first head 50b. The first contact surfaces 50c face the main body 40 and provide a specific purpose and function as is explained in greater detail below. The fastener apertures 52 and 54 include machine threads for engagement with a threaded fastener, as described in greater detail below.

The second bracket 46 includes a second tab 56, a third fastener aperture 58, and a fourth fastener aperture 60. The second tab 56 is located between the third fastener aperture 58 and the fourth fastener aperture 60. The second tab 56 includes a second shaft portion 56a and a second head 56b that is wider than the second shaft portion 56a. Since the second head 56b is wider than the second shaft portion 56a, the second head 56b includes second contact surfaces 56c along lower edges of the second head 56b. The fastener apertures 58 and 60 also include machine threads for engagement with a threaded fastener, as described in greater detail below. The second contact surfaces 56c face the main body 40 and provide a specific purpose and function as is explained in greater detail below.

As shown in FIG. 4, the first contact surfaces 50c are spaced apart from an upper surface 40b of the main body 40 of the component 12 by a first distance $D_1$ and the second contact surfaces 56c are spaced apart from the upper surface 40b of the main body 40 of the component by a second distance $D_2$, the first distance $D_1$ being greater than the second distance $D_2$. The first tab 50 and the second tab 56 are spaced apart from one another by a distance $D_3$. As shown in FIG. 4, the first and second heads 50b and 56b have a width $D_4$ and the first and second shaft portions 50a and 56a of the first and second tabs 50 and 56 have a width $D_5$.

The specific locations of the fastener apertures 52, 54, 56 and 58, and the spacing therebetween define an attachment pattern. The positioning of the first tab 50 and the second tab 56 is related to the attachment pattern and is discussed in greater detail below A more detailed description of the panel 20 is now provided with specific reference to FIGS. 5-13. The panel 20 is formed such that many sections of the upper surface 26 are co-planar. Correspondingly, there are many sections of the lower surface 28 of the panel 20 that are co-planar. However, the panel 20 further includes a plurality of embossed, pressed or otherwise offset sections that define at least a first area 66 and a second area 68 that includes regions that are not co-planar with the remainder of the panel 20, but rather are offset from the remainder of the panel 20. The panel 20 also includes a third area 70 that is located between the first area 66 and the second area 68. The third area 70 is not specifically necessary for installation of the component 12, but is mentioned for reference to recognition of the depictions of the panel 20 in the drawings. For example, in FIGS. 5-8 and 11, the third area 70 is clearly shown as an embossed area that is raised relative to the remainder of the upper surface 26 of the panel 20 and generally located between the first area 66 and the second area 68, but is spaced apart from the first area 66 and the second area 68.

Figure 13:
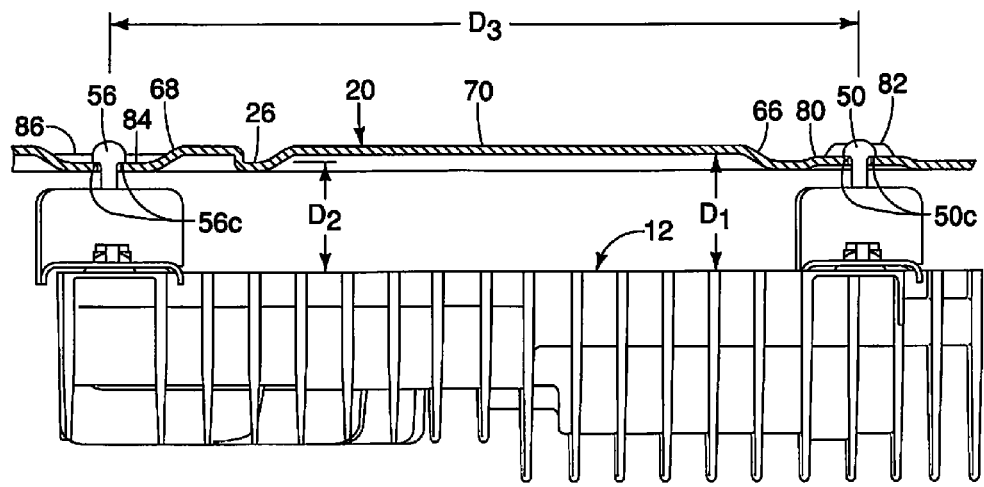
FIG. 13 is a cross-sectional view of the panel taken along the line 13-13 in FIG. 7, showing the first slot of the first area and the second slot of the second area of the panel with the first and second tabs of the component installed to the first and second slots, respectively, in accordance with the first embodiment.

The first area 66 defines a first slot 72 and the second area 68 of the panel 20 defines a second slot 74. The first slot 72 and the second slot 74 are spaced apart from one another by the distance $D_3$, the same distance between the first tab 50 and the second tab 56 of the mounting structure 42 of the component 12, as shown in FIG. 13. Each of the first slot 72 and the second slot 74 extend completely through the panel 20, from the upper surface 26 to the lower surface 28 of the panel 20.

As is described in greater detail below, the first tab 50 and the second tab 56 are located relative to one another in order to align with of the first slot 72 and the second slot 74, respectively, during installation of the component 12.

Figure 5:
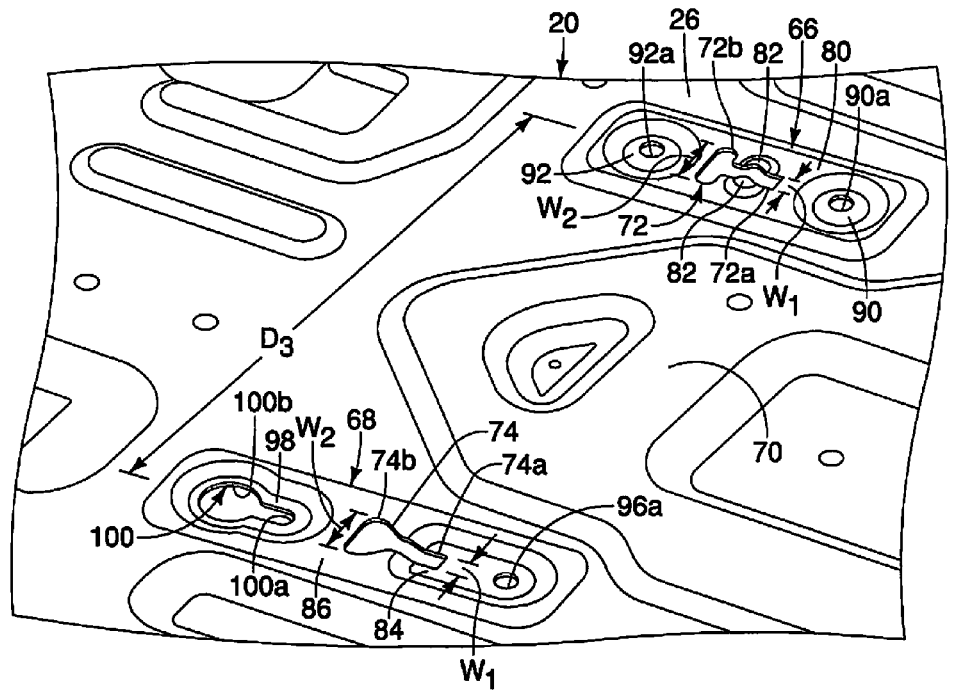
FIG. 5 is a perspective view of an upper surface the panel of the vehicle body structure showing a first area and a second area of the panel, the first area defining a first slot and fastener openings, the second area defining a second slot, a fastener opening and a fastener slot, the first slot and the second slot each having respective first ends and second ends, the second ends being wider than the first ends in accordance with the first embodiment.

As shown in FIG. 5, the first slot 72 has a first end 72a and a second end 72b. The first end 72a of the first slot 72 has a first width $W_1$ measured perpendicular to a length of the first slot 72 and the second end 72b of the first slot 72 has a second width $W_2$ that is greater than the first width $W_1$. Similarly, the second slot 74 has a first end 74a and a second end 74b. The first end 74a of the second slot 74 is dimensioned such that it also has the first width $W_1$ measured perpendicular to a length of the second slot 74 and the second end 74b of the second slot 74 is dimensioned with the second width $W_2$ (a maximum width of the second slot 74). In the depicted embodiment, the first ends 72a and 74a have the same width $W_1$ and the second ends 72b and 74b have the same (maximum) width $W_2$. As shown in FIG. 5, the first slot 72 and the second slot 74 have differing overall shapes. The first ends 72a and 74a can alternatively have the same shape, but can also be formed such that the second ends 72b and 74b have differing maximum widths. The first end 72a of the first slot 72 and the first end 74a of the second slot 74 extend in directions that are parallel to one another. Alternatively, the first ends 72a and 74a of the first slot 72 and second slot 74 can have differing widths and need not be identical.

The overall dimensions of the first slot 72 and the second slot 74 are directly related to the dimensions of the first tab 50 and the second tab 56. Specifically, the first slot 72 is dimensioned such that the first head 50b can pass freely through the second end 72b of the first slot 72, but cannot pass freely through the first end 72a of the first slot 72. The first shaft portion 50a of the first tab 50 can pass freely along the first end 72a of the first slot 72. Further, the second slot 74 is dimensioned such that the second head 56b can pass freely through the second end 74b of the second slot 74, but cannot pass freely through the first end 74a of the first slot 74. The second shaft portion 56a of the second tab 56 can pass freely along the first end 74a of the second slot 74.

As shown in FIGS. 5-10 and 13, the first area 66 of the panel 20 defines a first upper surface portion 80 at the first end 72a of the first slot 72. Further, the first area 66 of the panel 20 defines second upper surface portions 82 at opposite sides of the first slot 72 at a location spaced apart from the first end 72a of the first slot 72 and spaced apart from the second end 72b of the first slot 72. The second upper surface portions 82 are located adjacent to a central area of the first slot 72. As shown in FIG. 13, the second upper surface portions 82 are located vertically higher above the first upper surface portion 80. The second upper surface portions 82 can be formed as an embossment or deformed area such that the second upper surface portion 82 is raised up above the first upper surface portion 80.

Similarly as shown in FIGS. 5-8 and 11-13, the second area 68 of the panel 20 defines a third upper surface portion 84 at the first end 74a of the second slot 74. The second area 68 also defines a fourth upper surface portion 86 around the second end 74b of the second slot 74. The fourth upper surface portion 86 is located vertically higher than the third upper surface portion 84.

Figure 10:
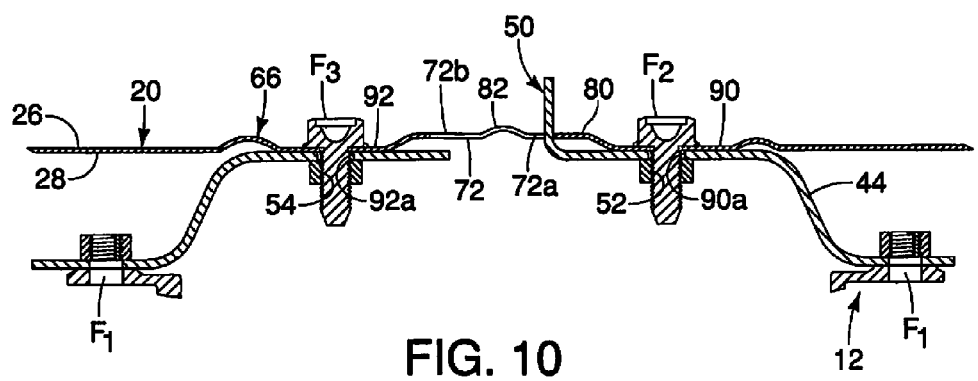
FIG. 10 is a cross-sectional view of the panel taken along the line 10-10 in FIG. 9, showing the first slot of the first area and surface portions of the panel shaped to restrict movement of the first tab once the first tab is installed at the first end of the first slot in accordance with the first embodiment.

Returning to FIGS. 5 and 10, the first area 66 of the panel 20 further defines a fifth upper surface portion 90 and a sixth upper surface portion 92 that are lower than the second upper surface portion 82. The fifth upper surface portion 90 defines a first fastener opening 90a and the sixth upper surface portion 92 defines a second fastener opening 92a. The fifth upper surface portion 90 and the sixth upper surface portion 92 are located at a height below the first upper surface portion 80 and below the second upper surface portion 82, as shown in FIG. 10. The third upper surface portion 84 is at a height lower than the second upper surface portion 82.

Figure 11:
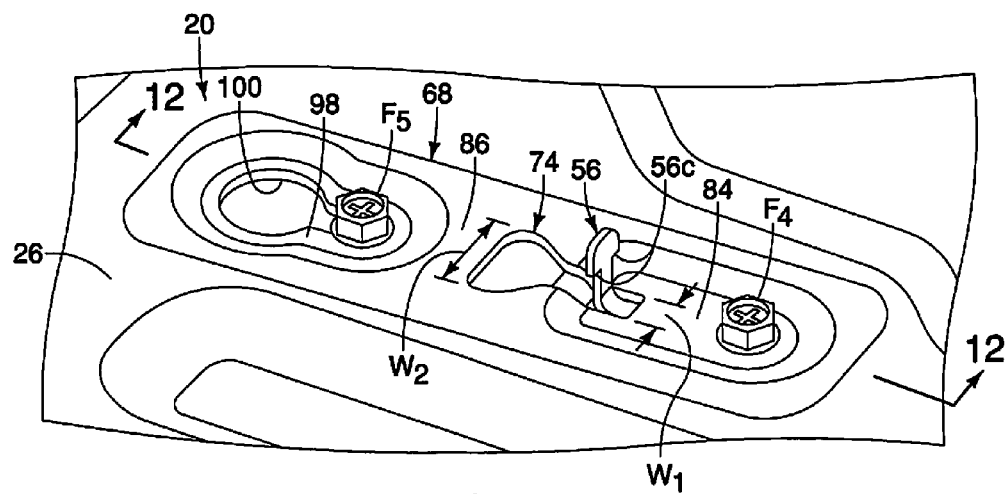
FIG. 11 is a perspective view of the panel showing the second area with a second one of the tabs of the component extending through the first end of the second slot in accordance with the first embodiment.
Figure 12:
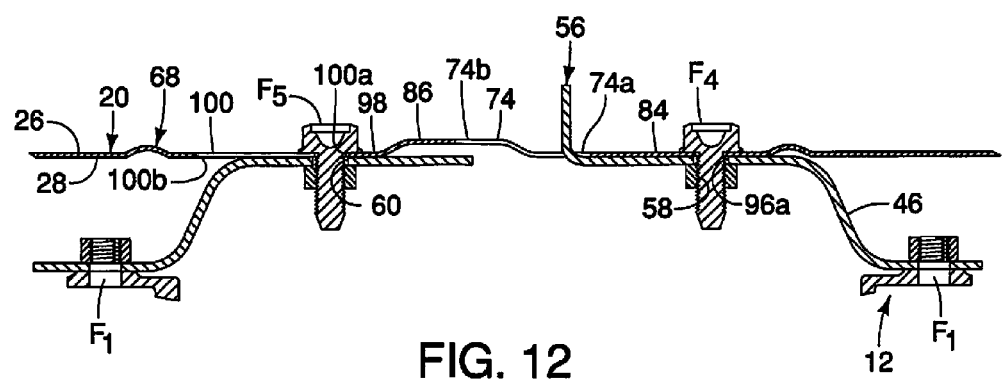
FIG. 12 is a cross-sectional view of the panel taken along the line 12-12 in FIG. 11, showing the second slot of the second area and surface portions of the panel shaped to restrict movement of the second tab once the second tab is installed at the first end of the second slot in accordance with the first embodiment.

As shown in FIGS. 5, 11 and 12, the second area 68 of the panel 20 includes further features. Specifically, the third upper surface portion 84 defines a third fastener opening 96a. The second area 68 includes a seventh upper surface portion 98 that defines a fastener slot 100. The third upper surface portion 84 and the seventh upper surface portion 98 are co-planar, and are at a height lower than the fourth upper surface portion 86, as shown in FIG. 12. However, it should be understood from the drawings and the description herein that the third upper surface portion 84 and the seventh upper surface portion 98 can alternatively be at differing heights (non-co-planar).

The fastener slot 100 has a first end 100a and a second end 100b. The second end 100b is wider than the first end 100a, as shown in FIGS. 5 and 11.

Figure 6:
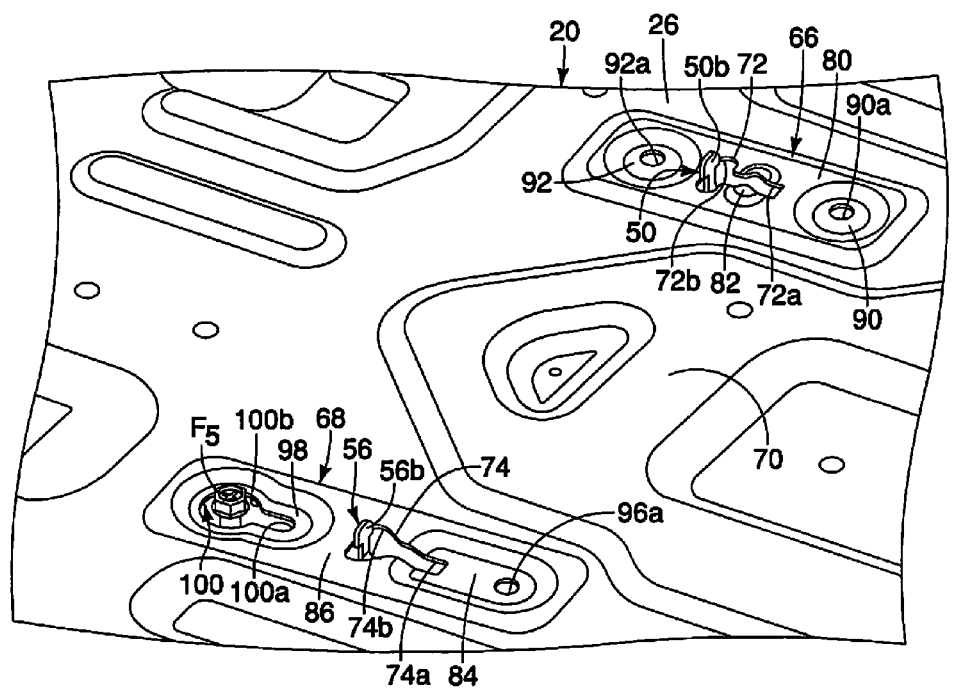
FIG. 6 is another perspective view of the panel similar to FIG. 5 showing the tabs of the component inserted from below into larger ends of the first slot and the second slot during installation of the component to the panel in accordance with the first embodiment.

A description of a first part of the installation process of the component 12 to the panel 20 is now provided with specific reference to FIGS. 6-8 and 13. Prior to installation, a fastener $F_5$ is installed to the fourth fastener aperture 60 of the mounting structure 42 of the component 12. As is explained in greater detail below, the fastener $F_5$ is not tightened but rather is only partially threaded into the fourth fastener aperture 60. As shown in FIG. 6, a first step in the installation process involves positioning the component 12 under the panel 20 and lifting it up such that the first head 50b of the first tab 50 moves upward passing through the second end 72b of the first slot 72. Simultaneously, the second head 56b of the second tab 56 moves upward passing through the second end 74b of the second slot 74. As shown in FIG. 6, the first head 50b and the second head 56b are positioned above the upper surface 26 of the panel 20. Hence, the first shaft portion 50a of the first tab 50 extends through the second end 72b of the first slot 72 and the second shaft portion 56a of the second tab 50 extends through the second end 74b of the second slot 74. With the fastener $F_5$ installed, the fastener $F_5$ also moves upward passing through the second end 100b of the fastener slot 100.

Figure 7:
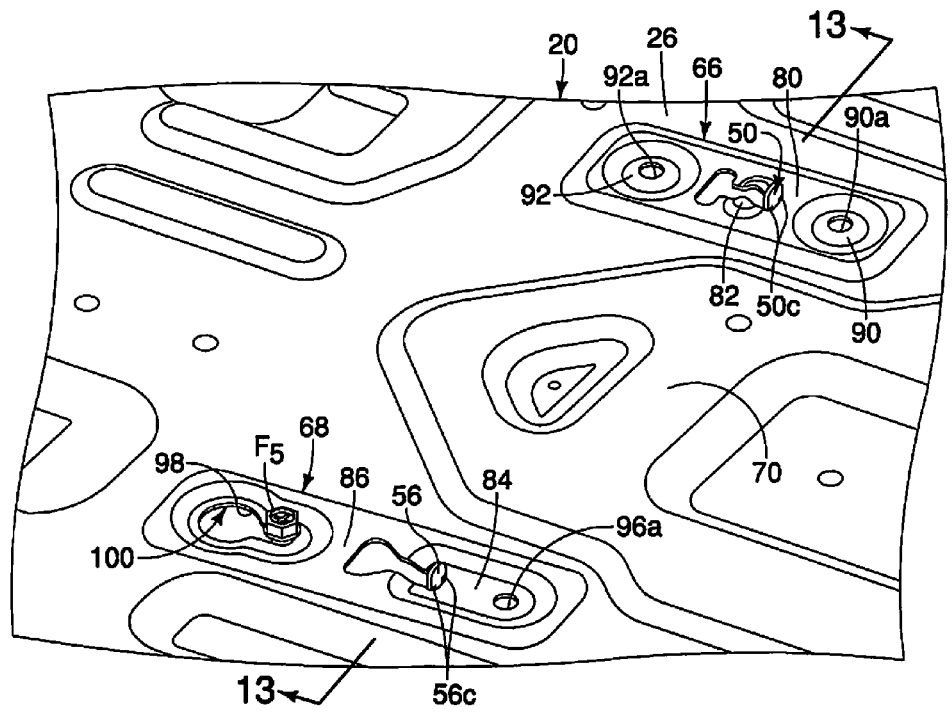
FIG. 7 is yet another perspective view of the panel similar to FIGS. 5 and 6 showing the tabs of the component moved to the respective first ends of the first slot and the second slot, with contact surfaces of the tabs resting on the upper surface of the panel temporarily supporting the component to the panel during installation of the component in accordance with the first embodiment.

Thereafter, as shown in FIG. 7, the component 12 is moved toward the rear of the vehicle body structure 10, causing the first shaft portion 50a to move or slide from the second end 72b of the first slot 72 toward the first end 72a of the first slot 72. Simultaneously, the second shaft portion 56a moves or slides from the second end 74b of the second slot 74 toward the first end 74a of the second slot 74. Further during this movement, the fastener $F_5$ is moved from the second end 100b of the fastener slot 100 to the first end 100a of the fastener slot. Since the first slot 72, the second slot 74 and the fastener slot 100 extend in directions that are substantially parallel to one another, the first tab 50 and the second tab 56 are moved in the same direction while the first shaft portion 50a and the second shaft portion 50a move along the first slot 72 and the second slot 74 toward the first ends 72a and 74a, respectively.

Figure 14:
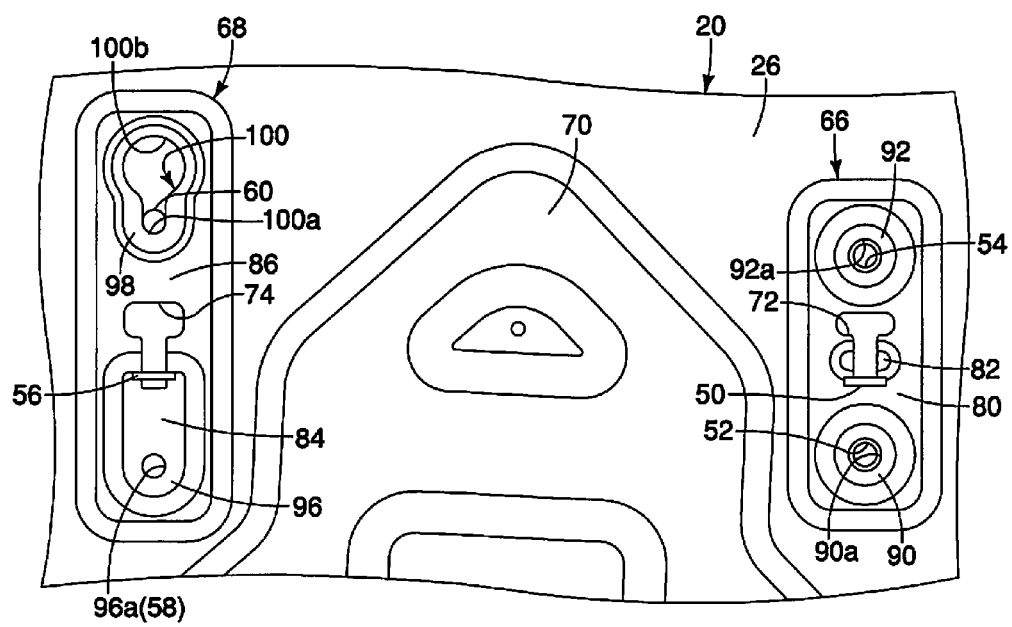
FIG. 14 is a top view of the panel showing the first tab of the component installed to the first end of the first slot, the second tab of the component installed to the first end of the second slot with the fastener apertures of the mounting structure of the component align with fastener openings in the first area and the fastener opening and the fastener slot of the second area during the installation process of the component to the panel in accordance with the first embodiment.

The component installer (technician or robot) releases the component 12 at this point thereby lowering the component 12 such that the contact surfaces 50c of the first tab 50 contact the upper surface 26 of the panel 20 at the first upper surface portion 80, and the contact surfaces 56c of the second tab 56 contact the upper surface 26 of the panel 20 at the third upper surface portion 84, as shown in FIGS. 7, 13 and 14. Further, the fastener $F_5$ contacts the seventh upper surface portion 98 as shown in FIG. 7, with the fastener $F_5$ remaining in an untightened state, only partially threaded into the fourth fastener aperture 60.

Hence, as shown in FIGS. 7 and 13, the component 12 rests on the panel 20 and temporarily hangs in place without fasteners via the contact between the contact surfaces 50c and 56c of the first and second tabs 50 and 56 and the upper surface 26 of the panel 20 at the first upper surface portion 80 and the third upper surface portion 84, respectively. The component 12 is not fixed in position by fasteners yet (the fastener $F_5$ is not yet tightened), but movement of the component 12 is restricted due to arrangement of the first upper surface portion 80 being lower than the second upper surface portions 82. Further, movement of the component 12 is further restricted due to the third upper surface portion 84 being lower than the fourth upper surface portion 86. The area of the upper surface 26 of the panel 20 where the contact surface 50c of the first tab 50 defines a first suspension surface or first suspension point. Similarly, the area of the upper surface 26 of the panel 20 where the contact surface 56c of the second tab 56 defines a second suspension surface or second suspension point. The first and second suspension points support the component 12 temporarily during the installation process, as described in greater detail below.

In other words, the second upper surface portions 82 are higher than the first upper surface portion 80 such that gravity assists in the retention of the first tab 50 at the first end 72a of the first slot 72. Similarly, the fourth upper surface portion 86 is higher than the third upper surface portion 84 such that gravity assists in the retention of the second tab 56 at the first end 74a of the second slot 74. Hence, the second upper surface portion 82 of the panel 20 restricts movement of the first tab 50 away from the first end 72a of the first slot 72 with the first tab 50 located at the first end 72a of the first slot 74, and the fourth upper surface portion 86 of the panel 20 restricts movement of the second tab 56 away from the first end 74a of the second slot 74 with the second tab 56 being located at the first end 74a of the second slot 74.

The configuration of the surface portions of the first area 66 and the second area 68 are beneficial to the component installer of the component 12 for a variety of reasons. For example, the component 12 is installed in a location of the vehicle body structure 10 that is difficult and/or awkward to work in. Specifically, the component 12 is being installed within a forward region of the storage compartment or trunk 30 of the vehicle body structure 10 and to the underside or lower surface of the panel 20. The component installer must reach deep within the trunk 30 to install the component 12, or must climb into the space that defines the trunk 30. With the arrangement of the panel 12 described above, the component installer can continue with the installation process without concern regarding contact with the component 12 and possibly bumping the component 12 out of position because the first and second tabs 50 and 56 resting on the upper surface 26 of the panel 20 are retained in the positions shown in FIG. 7 by the second upper surface portion 82 and the fourth upper surface portion 86.

As shown in FIG. 13, the third upper surface portion 84 is at a height lower than the first upper surface portion 80. The first contact surfaces 50c contact the first upper surface portion 80 and the second contact surfaces 56c contact the third upper surface portion 84. Since the first contact surfaces 50c are at a location that is higher than the location of the second contact surface 56c (the first distance $D_1$ being greater than the second distance $D_2$) the component 12 is suspended from the panel 12 is a generally level orientation. In other words, the relative heights of the first upper surface portion 80 and the third upper surface portion 84 correspond to the relative heights of the first contact surfaces 50c of the first tab 50 and the second contact surfaces 56c of the second tab 56.

Figure 15:
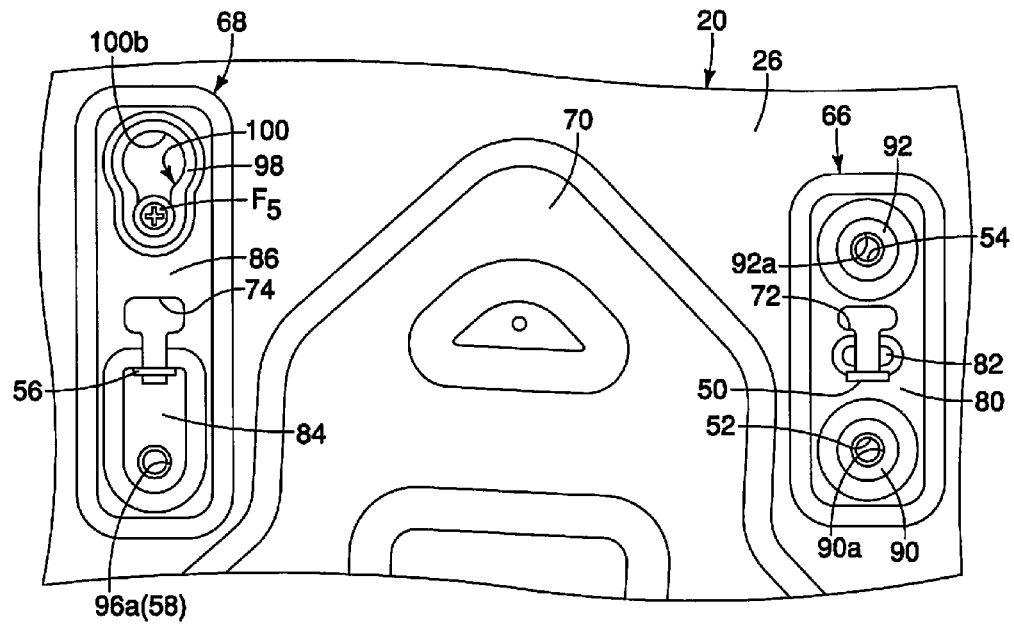
FIG. 15 is a second top view of the panel identical to FIG. 14, except that a first of a plurality of fasteners is installed to a first end of the fastener slot and threaded into a corresponding one of the fastener apertures in the mounting structure of the component with the first of the plurality of fasteners only being hand tightened in accordance with the first embodiment.

As shown in FIGS. 7, 14 and 15, the fastener $F_5$ is the first mechanical fastener installed first to the panel 20 and the component 20. However, the fastener $F_5$ is merely hand tightened and is not fully tightened or torqued initially. Initially, the fastener $F_5$ is not tightened, but is merely threaded in such a way that the head of the fastener $F_5$ contacts the seventh upper surface portion 98 of the panel 20. In this condition, the contact surfaces 56c of the second tab 56 remain in contact with the upper surface 26 of the panel 20. It should be understood, that the fastener $F_5$ can alternatively be installed to the panel 20 and the component 12 after the first and second tabs 50 and 56 are positioned to rest on the upper surface 26 of the panel 20. However, in the depicted embodiment, the fastener F5 is threaded loosely into the fourth fastener aperture 60 prior to installation of the first and second tabs 50 and 56 into the first and second slots 72 and 74.

The area of contact between the fastener $F_5$ and the panel 20 (the seventh upper surface portion 98) defines a third suspension point for the component 12. The third suspension point (the seventh upper surface portion 98) is important to prevent pivoting movement of the component 12 about a pivot axis (not shown) that extends through the first suspension point (contact between the contact surfaces 50c and the panel 20) and the second suspension point (contact between the contact surfaces 56c and the panel 20). Any such pivoting movement might cause "winking" of the fastener apertures 90a, 92a and 96a relative to the fastener openings 52, 54 and 58 during the installation of the fasteners $F_2$, $F_3$ and $F_4$. The "winking" referred to above is basically defined as a circumstance where any one or all of the fastener apertures 90a, 92a and 96a becomes slightly mis-aligned with the corresponding one of the fastener openings 52, 54 and 58 to a degree where installation of the fasteners $F_2$, $F_3$ and $F_4$ is more difficult or impossible. The "winking" can also be a circumstance where any one or all of central axis of the fastener apertures 90a, 92a and 96a becomes angularly offset from the central axis of the corresponding one of the fastener openings 52, 54 and 58 to a degree where installation of the fasteners $F_2$, $F_3$ and $F_4$ might cause cross threading.

With the head of the fastener $F_5$ resting on the upper surface 26 of the panel 20 with the fastener $F_5$ only hand tightened as shown in FIGS. 7, 14 and 15, the fastener $F_5$ and the first and second tabs 50 and 56 provide the component 12 with the following movement restrictions: prevent pivoting, rearward and lateral movement of the component 12; the fastener $F_5$ and the first and second tabs 50 and 56 prevent downward movement of the component 12; and the second upper surface portion 82 and the fourth upper surface portion 86 restrict forward movement of the component 12 relative to the panel 12.

Figure 8:
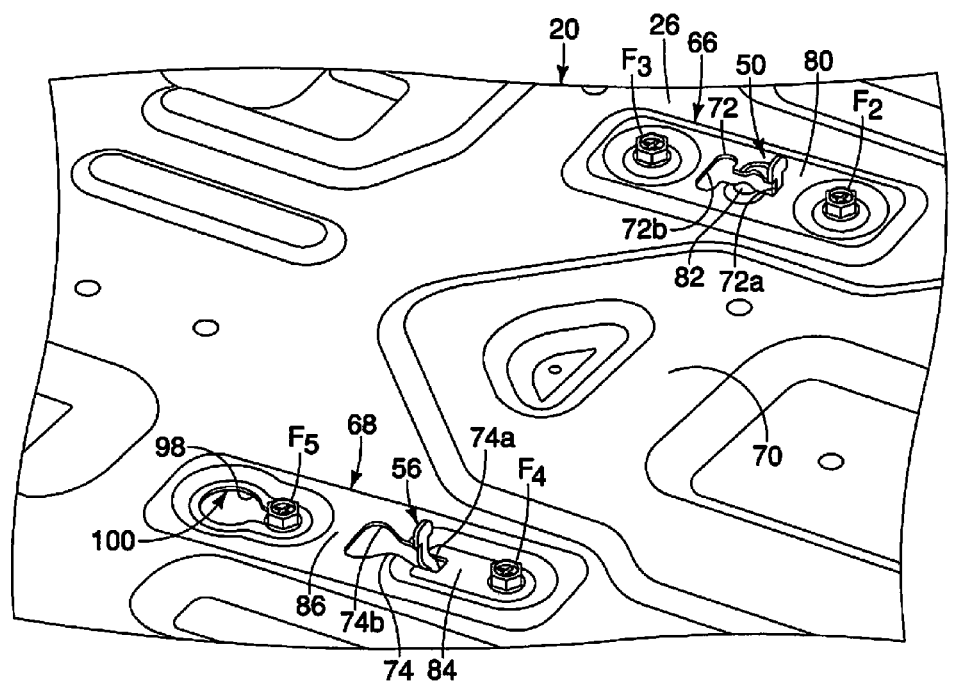
FIG. 8 is still another perspective view of the panel similar to FIGS. 5, 6 and 7 showing the contact surfaces of the tabs of the component lifted up from the upper surface of the panel due to installation of fasteners to the panel and the component fully installing the component to the panel in accordance with the first embodiment.
Figure 9:
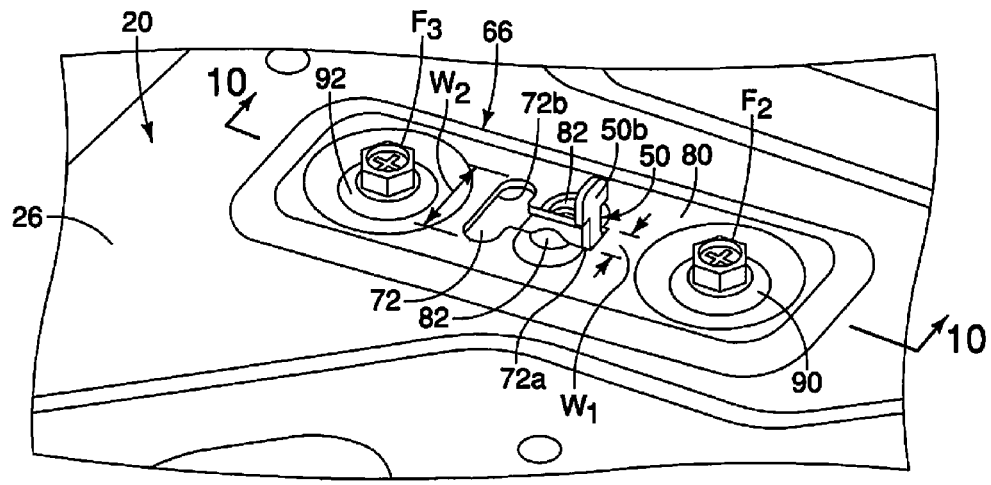
FIG. 9 is a perspective view of the panel showing the first area with a first one of the tabs of the component extending through the first end of the first slot in accordance with the first embodiment.

As is explained further below, fasteners $F_2$, $F_3$ and $F_4$ are next installed to secure the component 12 to the panel 20 in a specific sequence, during which the fastener $F_5$ is fully tightened. However, as shown in FIG. 8, after the fasteners $F_2$, $F_3$, $F_4$ and $F_5$ are completely installed and torqued, the first contact surfaces 50c of the first tab 50 and the second contact surfaces 56c of the second tab 56 are lifted off of the upper surface 26 of the panel 20.

A description of an installation and tightening sequence of the fasteners $F_2$, $F_3$, $F_4$ and $F_5$ is now provided with specific reference to FIGS. 14-18.

As shown in FIG. 14 with the fastener $F_5$ removed, the spacing and relative positioning between the first fastener opening 90a, the second fastener opening 92a, the third fastener opening 96a and the first end 100a of the fastener slot 100 of the panel 20 define a first fastener pattern. Further, the spacing and relative positioning between the fastener apertures 52, 54, 58 and 60, of the mounting structure 42 of the component 12 define a second fastener pattern. When the first tab 50 is positioned within the first end 72a of the first slot 72 and the second tab 56 is positioned within the first end 74a of the second slot 74 as shown in FIG. 14, the second fastener pattern coincides or aligns with the first fastener pattern. In other words, the second fastener pattern may not be perfectly aligned in all circumstances with the first fastener pattern, but will at least coincide therewith such that the fastening apertures 52, 54, 58 and 60 are substantially accessible through corresponding ones of the first fastener opening 90a, the second fastener opening 92a, the third fastener opening 96a and the fastener slot 100. More specifically, the first fastener aperture 52 coincides or aligns with the first fastener opening 90a, the second fastener aperture 54 coincides or aligns with the second fastener opening 92a, the third fastener aperture 58 coincides or aligns with the third fastener opening 96a and the fourth fastener aperture 58 coincides or aligns with the first end 100a of the fastener slot 100.

As is also shown in FIG. 14, the first fastener opening 90a of the panel 20 has a diameter that is larger than the diameter of the first fastener aperture 52 of the component 12. Similarly, the second fastener opening 92a of the panel 20 has a diameter that is larger than the diameter of the second fastener aperture 54. In other words, the first fastener opening 90a and the second fastener opening 92a are oversized relative to the first and second fastener apertures 52 and 54. The oversizing of the first fastener opening 90a and the second fastener opening 92a relative to the first and second fastener apertures 52 and 54 is provided to allow for engineering tolerances and because the first fastener opening 90a and the second fastener opening 92a might not be perfectly aligned with the fastener apertures 52 and 54 with the component 12 hanging from the panel 20 prior to installation of the fasteners $F_2$-$F_5$.

As shown in FIG. 14, the third fastener aperture 58 and the third fastener opening 96a have approximately the same diameter. Hence, the third fastener opening 96a is smaller than the first and second fastener openings 90a and 92a. The fourth fastener aperture 60 has a diameter that is equal to the width of the first end 100a of the fastener slot 100.

As shown in FIG. 15, the fastener $F_5$ is the first mechanical fastener installed first to the panel 20 and the component 20, installed prior to suspension of the component 12 to the panel 20 by the first and second tabs 50 and 56. As mentioned above, the fastener $F_5$ is merely hand tightened and is not fully tightened or torqued initially. Specifically, the fastener $F_5$ is threaded such that the head of the fastener $F_5$ contacts the upper surface 26 of the panel 20.

Figure 16:
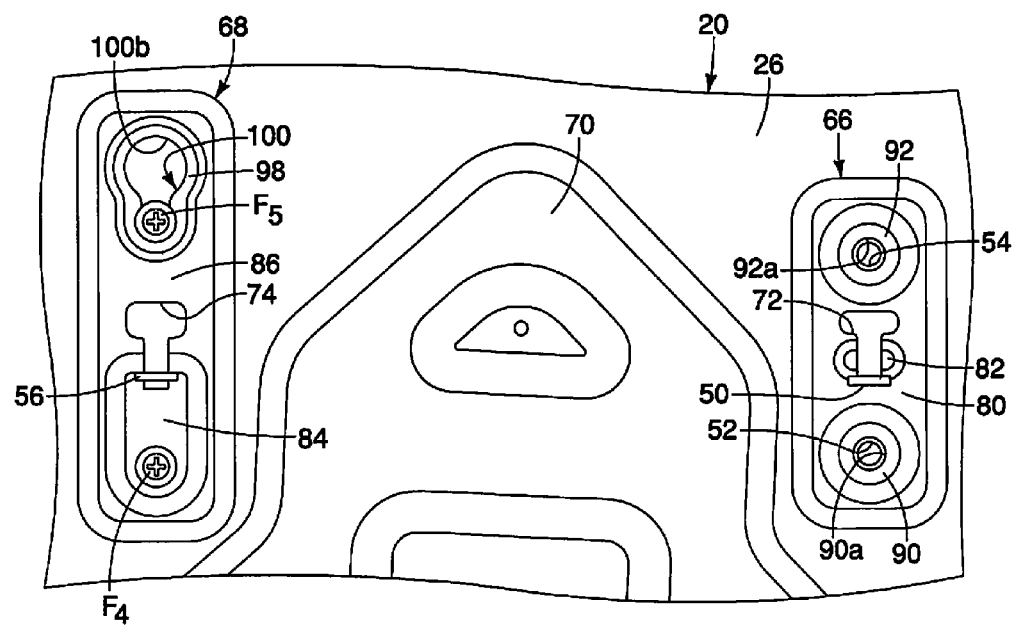
FIG. 16 is a top view of the panel identical to FIG. 15, except that a second of the plurality of fasteners is installed to the fastener opening in the second area of the panel with the second of the plurality of fasteners being fully tightened in accordance with the first embodiment.

Next, as shown in FIG. 16, the fastener $F_4$ is installed. Specifically, the fastener $F_4$ is installed such that it extends through the third fastener opening 96a and is threaded into the mechanical threads of the third fastener aperture 58. The fastener $F_4$ can be fully tightened and torqued at this point pulling the component 12 upward such that the contact surfaces 56c of the second tab 56 no longer contact the upper surface 26 of the panel 20. As the fastener $F_4$ is tightened and torqued, the first tab 50, the second tab 56 and the fastener $F_5$ prevent noticeable movement of the component 12 relative to the panel 20.

Figure 17:
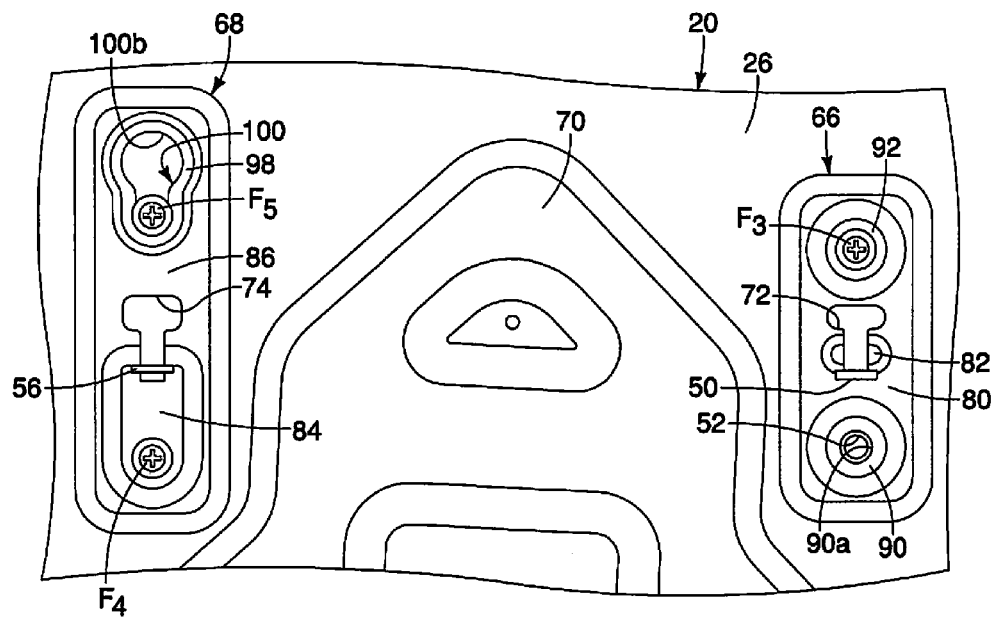
FIG. 17 is a top view of the panel identical to FIG. 16, except that a third of the plurality of fasteners is installed to one of the fastener openings in the first area of the panel with the third of the plurality of fasteners being fully tightened in accordance with the first embodiment.

Next, as shown in FIG. 17, the fastener $F_3$ is installed. Specifically, the fastener $F_3$ is installed such that it extends through the second fastener opening 92a and is threaded into the mechanical threads of the second fastener aperture 54. The fastener $F_3$ can be fully tightened and torqued at this point pulling the component 12 upward such that the contact surfaces 50c of the first tab 50 no longer contact the upper surface 26 of the panel 20. It is possible that the tightening of the fastener $F_4$ could lift up the side of the component 12 having the first tab 50. However, once the fastener $F_3$ is tightened and torqued, the contact surfaces 50c of the first tab 50 are definitely lifted up and no longer contact the upper surface 26 of the panel 20. Since the second fastener opening 92a is larger than the fastener aperture 54 of the component 12, installation of the fastener $F_3$ is assured with little or no risk of mis-alignment between the second fastener opening 92a and the second fastener aperture 54. As the fastener $F_3$ is tightened and torqued, the first tab 50, the second tab 56 and the fasteners $F_5$ and $F_4$ prevent movement of the component 12 relative to the panel 20.

Figure 18:
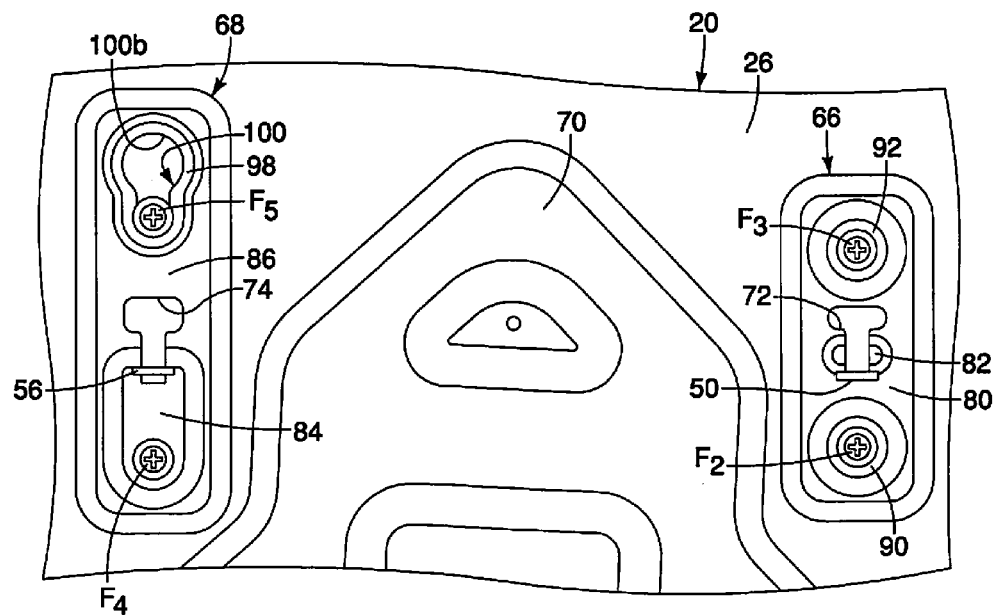
FIG. 18 is a top view of the panel identical to FIG. 17, except that a fourth of the plurality of fasteners is installed to the other of the fastener openings in the first area of the panel with the fourth of the plurality of fasteners being fully tightened and the first of the plurality of fasteners also being fully tightened in accordance with the first embodiment.

Next, as shown in FIG. 18, the fastener $F_2$ is installed. Specifically, the fastener $F_2$ is installed such that it extends through the first fastener opening 90a and is threaded into the mechanical threads of the first fastener aperture 52. The fastener $F_2$ can be fully tightened and torqued at this point fully securing the component 12 to the panel 20. Since the first fastener opening 90a is larger than the first fastener aperture 52 of the component 12, installation of the fastener $F_2$ is assured with little or no risk of mis-alignment between the first fastener opening 90a and the first fastener aperture 52. As the fastener $F_2$ is tightened and torqued, the first tab 50, the second tab 56 and the fasteners $F_5$, $F_4$ and $F_3$ prevent movement of the component 12 relative to the panel 20.

Finally, the fastener $F_5$ can be tightened and torqued and installation of the component 12 is completed.

The embossed or deformed areas of the first area 66 and the second area 68 make the installation process of the component 12 easier and more reliable without use of additional robotic equipment or additional technician's hands. The component 12 is more simply and easily installed as a result of the specific design of the panel 20 and the mounting structure 42 of the component 12, described above.

The vehicle body structure 10 includes many conventional components that are well known in the art. Since these conventional components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle component support structure. Accordingly, these terms, as utilized to describe the present invention should be interpreted relative to a vehicle equipped with the vehicle component support structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle component support structure comprising:
a vehicle body structure including a horizontally oriented panel rigidly supported within the vehicle body structure, the panel having an upper surface and a lower surface, a first area of the panel defining a first slot, and a second area of the panel spaced apart from the first area and defining a second slot,
each of the first and second slots extending from the upper surface to the lower surface of the panel,
a first end of the first slot having a first width measured perpendicular to a length of the first slot and a second end of the first slot having a second width that is greater than the first width,
a first end of the second slot having a third width and a second end of the second slot having a fourth width greater than the third width,
the first area of the panel defining a first upper surface portion at the first end of the first slot and second upper surface portions at either side of the first slot at a location spaced apart from the first end of the first slot, the second upper surface portions being located vertically higher above the first upper surface portion,
the second area of the panel defining a third upper surface portion at the first end of the second slot; and
a component having a main body and a mounting structure, the mounting structure including a first tab and a second tab spaced apart from the first tab by a distance corresponding to a distance between the first slot and the second slot,
the first tab includes a first shaft portion and a first head that is wider than the first shaft portion, the second tab includes a second shaft portion and a second head that is wider than the second shaft portion, such that the first head of the first tab is inserted through the second end of the first slot, the second head of the second tab is inserted through the second end of the second slot, the first tab and the second tab thereafter moved to a corresponding one of the first end of the first slot and the first end of the second slot, the first head of the first tab resting on the first upper surface portion of the first area and the second head resting on the third upper surface portion of the second area to suspend the component from the panel, such that the second upper surface portions of the first area of the panel restricts movement of the first tab away from the first end of the first slot.

2. The vehicle component support structure according to claim 1, wherein the panel defines a parcel shelf located between a rear portion of a passenger compartment adjacent a rear window and a cargo area.

3. The vehicle component support structure according to claim 1, wherein the panel includes a plurality of fastener openings in the first area and the second area, and the mounting structure of the component includes a plurality of corresponding fastener receiving holes that align with the plurality of fastener openings with the first tab positioned at the first end of the first slot and the second tab position at the first end of the second slot.

4. The vehicle component support structure according to claim 3, wherein the first head of the first tab has a first contact surface and the second head of the second tab has a second contact surface, the first and second contact surfaces resting on the upper surface of the panel with the first tab and the second tab installed to the first slot and the second slot such that the component is suspended from the panel by the first tab and the second tab during installation of the component.

5. The vehicle component support structure according to claim 4, further comprising a plurality of mechanical fasteners that are installed to corresponding ones of the plurality of the fastener receiving holes and corresponding ones of the fastener openings after the first tab and the second tab are inserted into the first slot and the second slot, respectively, such that after tightening of the plurality of fasteners the component is secured to the panel and the first contact surface and the second contact surface are lifted up and separated from the upper surface of the panel.

6. The vehicle component support structure according to claim 1, wherein the first slot and the second slot extend in directions that are parallel to one another such that the first tab and the second tab are moved in the same direction while the first shaft portion and the second shaft portion are being installed to the first slot and the second slot.

7. The vehicle component support structure according to claim 1, wherein the first head of the first tab has a first contact surface and the second head of the second tab has a second contact surface, the first and second contact surfaces resting on the upper surface of the panel with the first tab and the second tab installed to the first slot and the second slot such that the component is suspended from the panel by the first tab and the second tab during installation of the component.

8. The vehicle component support structure according to claim 7, wherein the first shaft portion extends through the first slot and the second shaft portion extends through the second slot during installation of the component.

9. The vehicle component support structure according to claim 1, wherein the second upper surface portions are located between the first end and the second end of the first slot.

10. The vehicle component support structure according to claim 1, wherein the second area of the panel defines a fourth upper surface portion at a location spaced apart from the first end of the second slot, the fourth upper surface portion being located vertically higher than the third upper surface portion, and the fourth upper surface portion of the panel restricts movement of the second tab away from the first end of the second slot with the second tab being located at the first end of the second slot.

11. The vehicle component support structure according to claim 10, wherein the first area of the panel further defines a fifth upper surface portion and a sixth upper surface portion that are lower than the second upper surface portion, the fifth upper surface portion defining a first fastener opening and the sixth upper surface portion defining a second fastener opening.

12. The vehicle component support structure according to claim 11, wherein the fifth upper surface portion and sixth upper surface portion are lower than the second upper surface portion.

13. The vehicle component support structure according to claim 11, wherein the second area of the panel further defines a seventh upper surface portion that defines a fastener slot, and the third upper surface portion defines a third fastener opening.

14. The vehicle component support structure according to claim 13, wherein the first, second and third fastener openings and the fastener slot are positioned with respect to one another defining a first attachment pattern, and the mounting structure of the component includes first, second, third and fourth fastener apertures positioned with respect to one another defining a second attachment pattern such that with the first tab resting on the first upper surface portion and the section tab resting on the third upper surface portion the first attachment pattern aligns with the second attachment pattern such that the first fastener opening coincides with the first fastener aperture, the second fastener opening coincides with the second fastener aperture, the third fastener opening coincides with the third fastener aperture and a portion of the fastener slot coincides with the fourth fastener aperture.

15. The vehicle component support structure according to claim 14, wherein the fastener slot has a first end that defines a first overall width and a second end width that defines a second overall width that is at least twice the first overall width, the first end of the fastener slot coinciding with the fourth fastener aperture.

16. The vehicle component support structure according to claim 14, wherein the first fastener opening and the second fastener opening have diameters that are larger than corresponding diameters of the first fastener aperture and the second fastener aperture, the third fastener opening has a diameter that is approximately equal to a diameter of the third fastener aperture and is smaller than the diameters of the first and second fastener openings, and the first overall width of the first end of the fastener slot is approximately equal to the diameter of the third fastener opening.

17. The vehicle component support structure according to claim 13, wherein
the third upper surface portion is at the same height as the seventh upper surface portion.

18. The vehicle component support structure according to claim 13, wherein
the first upper surface portion is higher than the third upper surface portion.

19. The vehicle component support structure according to claim 13, wherein
the first head includes a first contact surface that contacts the first upper surface with the first head of the first tab resting on the first upper surface, and the second head includes a second contact surface that contacts the third upper surface with the second head of the second tab resting on the third upper surface, the first contact surface being spaced apart from an upper end of the component by a first distance and the second contact surface being spaced apart from the upper end of the component by a second distance, the first distance being greater than the second distance.

\* \* \* \* \*